Dec. 19, 1933.　　　T. L. FAWICK　　　1,940,407
SPRING ENGAGED SHOE CLUTCH
Filed May 27, 1931
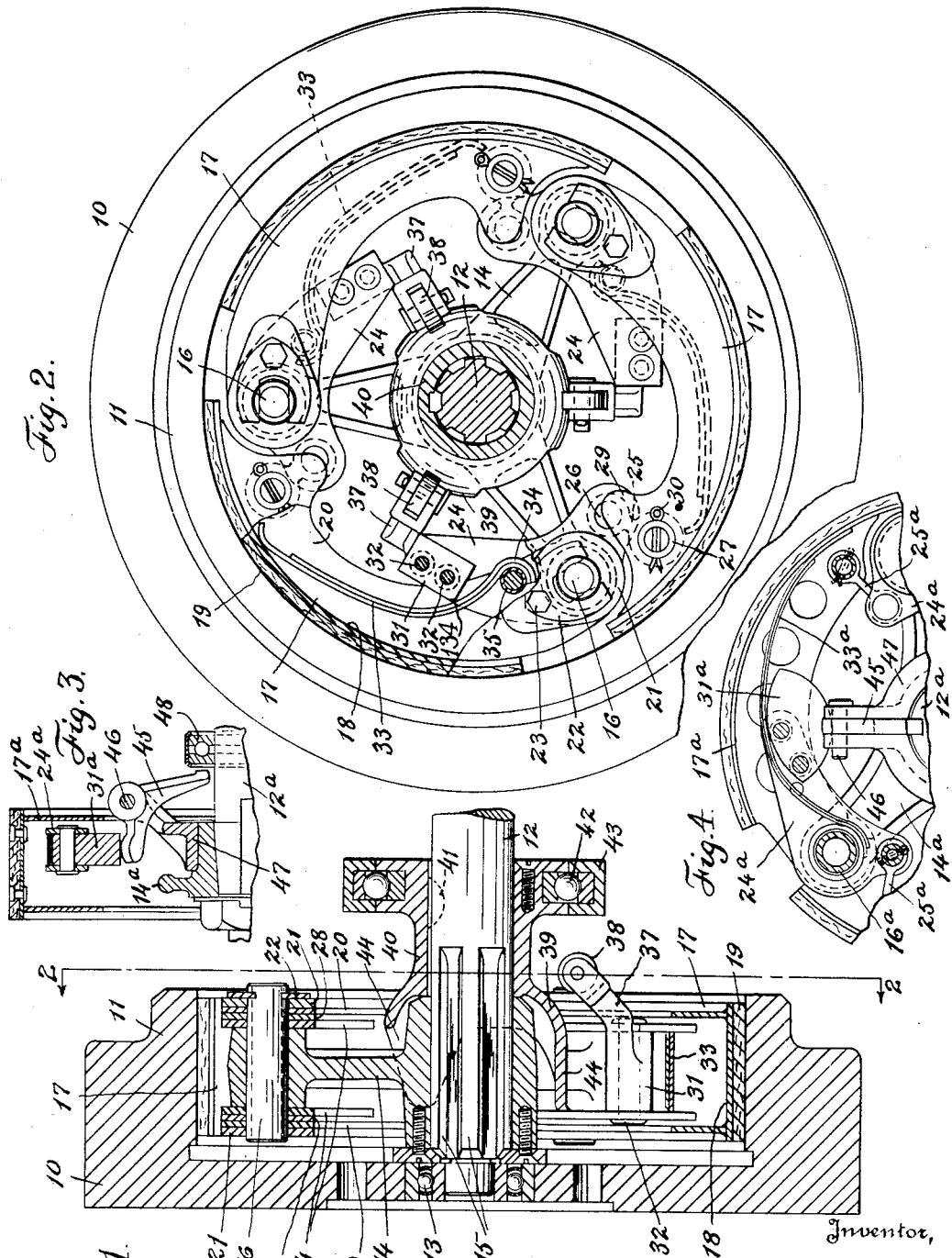
Inventor,
T. L. Fawick,
By Robert M. Pierson,
Attorney Patented Dec. 19, 1933

1,940,407

UNITED STATES PATENT OFFICE 1,940,407

SPRING-ENGAGED SHOE CLUTCH

Thomas L. Fawick, Akron, Ohio, assignor to Fawick Manufacturing Company, Waukesha, Wis., a corporation of Wisconsin Application May 27, 1931. Serial No. 540,229

12 Claims. (Cl. 192—75)

This invention relates to friction clutches of the shoe type, including those employing outwardly-acting shoes. Its objects are to provide improvements in such clutches adapting them for use in automobile vehicles, and to reduce or eliminate the necessity for adjusting the shoes to compensate for wear of the friction surfaces.

Of the accompanying drawing, Fig. 1 is a longitudinal section of a clutch embodying the present invention in a preferred form.

Fig. 2 is a rear elevation from the plane 2—2 of Fig. 1, partly broken away and in section.

Fig. 3 is a partial longitudinal section showing a modification.

Fig. 4 is a partial rear elevation and section of said modification.

In the drawing, 10 is a rotary driving member, such as the flywheel of an internal combustion engine, having a flange 11 provided with an internal cylindrical friction surface. 12 is the driven shaft whose forward end is supported by an anti-friction pilot bearing 13 in the web of the flywheel.

14 is a three-armed spider whose hub is connected by splines 15 in non-turning engagement with the shaft 12 for supporting the friction shoes and their operating levers. On pivot pins 16 at the ends of the spider arms are mounted the outwardly-engaging friction shoes 17 here shown as three in number, although the number might be varied. Each shoe comprises a body including an arcuate foundation plate 18 to which the friction facings 19 are secured, and side plates 20 attached to said foundation plate in a suitable manner as by spot welding. The shoe bodies straddle the ends of the spider arms and are provided with perforated reinforcing plates 21 welded to the side plates and surrounding the pivot pins 16. Each pin is detachably secured in non-turning relation to the rear side plate of the shoe body by means of a U-shaped retaining clip 22 fastened to said plate by a screw 23 and having its legs engaged in opposite parallel flat-bottomed grooves near the end of the pin substantially as described in my prior application Serial No. 417,422, filed Dec. 30, 1929, patented March 1, 1932, No. 1,847,389.

Also pivoted on the pins 16 and straddling the ends of the spider arms are a series of shoe-actuating levers 24 each of which has a short arm adapted to operate the shoe 17 next adjacent to the one on whose pivot pin the lever is mounted, through a link 25 connected by an inner pivot pin 26 with the lever arm, and by an outer pivot pin 27 with the shoe.

Each lever is formed with a pair of side plates spaced from those of the adjacent shoe body by means of washers 28, and the link 25 is held on the inner pivot pin 26 between said plates, the pin being retained against endwise displacement by means of ears 29 formed on the side plates of the shoe body which is operated by said link and projecting radially inward therefrom. This arrangement avoids the use of separate retaining means for the pin 26. The outer pivot pin 27 may be detachably retained against endwise movement by suitable means including a cotter pin 30.

Each shoe-operating lever 24 is provided on the end opposite to its linked end, as in my aforesaid prior application, with a weight block 31 secured between the lever plates by means of rivets 32. The mass of this block, added to the weight of the associated parts on the same side of the pivot pin 16, enables the lever 24 to counterbalance the effect of centrifugal force upon the short arm of said lever and its link and the free end of the shoe connected with said link.

According to my present invention, I provide a shoe-projecting spring connecting each of the shoes 17 with the arm of the lever 24 located radially inward from said shoe. These springs 33 as here shown are of the laminated leaf type, each having a hooked inner end 34 anchored around a cross pin 35 which connects the side plates of the lever 24, and a slightly curved outer end bearing against the inner side of the foundation plate 18 of the shoe near its linked connection with the next lever 24 which operates said shoe. In its unstressed condition, each of these springs is substantially straight but is placed under tension to exert the desired outward pressure on the shoe by bending it around a bearing corner 134 of the weight block 31.

For actuating the levers 24 to positively retract the shoes 17 against the pressure of their springs 33, I form each of the weight blocks 31 with a rearwardly-projecting arm 37 which carries a roller 38 mounted in a radial longitudinal plane and located in the path of a rearwardly-acting cam or cone element 39 formed on a sleeve 40 surrounding the driven shaft 12 and slidable longitudinally thereon. Said sleeve is held by a key 41 in non-turning relation to the shaft and is adapted to be actuated through a ball bearing 42 by a clutch throw-out collar 43 connected with the usual pedal (not shown). The sleeve has a cam shoulder for each of the roller arms 37, and extending forwardly beyond each of said shoulders is a horizontal portion or horn 44 projecting between adjacent arms of the shoe-supporting spider 14.

In the operation of this invention, the cam sleeve 40 is normally held by a suitable clutch pedal spring in a forward position as represented in Fig. 1 so that its cam portions 39 are disengaged from the lever roller 38. The springs 33 are thereby allowed to press the shoes 17 into driven engagement with the flange of the flywheel 10. To release the clutch, the sleeve 40 is moved rearwardly and its cam shoulders 39 engage the rollers 38 to turn the levers 24 on their pivots, thereby drawing inwardly the free ends of the shoes to which they are linked, against the pressure of the springs 33, the rollers being permitted to ride on the horizontal horns 44 during full retraction of the shoes.

This clutch is shown without any adjustment for taking up wear, although one might obviously be provided if desired. As the clutch facings 19 wear down, the rollers 38 simply move inwardly closer to the cam shoulders 39 in the forward position of the sleeve 40 so that they are engaged by said shoulders earlier in the rearward stroke of the sleeve, the original gap between the two being sufficient to allow for a considerable amount of wear.

The invention is not wholly restricted to a rearward engagement of the control sleeve with the levers or their shoe-operating devices, and various changes of embodiment might be made without departing from the scope of the claims.

In the modification illustrated in Figs. 3 and 4, outwardly-engaging pivoted friction shoes 17ª, counterbalanced operating levers 24ª and connecting links 25ª are shown in substantially the same form and arrangement as previously described. In this case a counterweight 31ª having arcuate edge faces is shown, riveted between the side plates of lever 24ª and forming a middle bearing or abutment for the laminated shoe-projecting spring 33ª. One end of said spring bears outwardly on the shoe 17ª as before, and the other end is hooked under the shoe and lever pivot pin 16ª. A secondary angular operating lever 45, one for each shoe and main lever, is pivoted at 46 between ears on a collar 47 fixed to the hub of the shoe-supporting spider 14ª, said lever having a horizontal arm engaging under the counterweight 31ª and a radial arm engaged by a ball-bearing thrust collar 48 surrounding the driven shaft 12ª, so that the shoes are retracted to release the clutch, through the levers 24ª and 45, when said thrust collar is slid forwardly on the shaft.

In both embodiments of my invention, the driving wheel rotates counter-clockwise as viewed in Figs. 2 and 4, that is in a direction such that the friction of said wheel against the shoe when the clutch is engaged exerts a servo action tending to increase the engaging pressure, and this action greatly reduces the duty required of the springs as compared with an opposite or clockwise rotation of the driving wheel.

I claim:

1. In a friction clutch, the combination of a shoe support, a shoe-operating lever pivoted thereto, means for positively effecting a shoe-retracting movement of said lever, a friction shoe pivoted at one end to said support, and spring means connecting said lever and a movable portion of the shoe remote from the pivoted end of the latter for yieldingly projecting the latter into operative position.

2. In a friction clutch, the combination of a shoe support, a series of shoes pivoted thereon, a lever pivoted on said support for operating one of said shoes, means for positively effecting a shoe-retracting movement of said lever, and spring means interposed between said lever and a portion of another shoe of the series remote from the latter's pivot for yieldingly projecting the latter.

3. In a friction clutch, the combination of a shoe support, a series of radially-acting shoes pivoted to said support, a series of levers pivoted to said support coaxially with the respective shoes and each adapted to operate the next adjacent shoe, and springs interposed between the respective levers and the shoes adjacent to the ones operated by said levers for yieldingly projecting the shoes.

4. In a friction clutch, the combination of a radially-acting shoe, a shoe-operating lever weighted to counteract the effect of centrifugal force upon said shoe, an adjacent pivoted shoe, and a spring interposed between the latter and the lever for yieldingly projecting said adjacent shoe.

5. In a friction clutch, the combination of a shoe-operating lever, means for positively effecting a shoe-retracting movement of said lever, a pivoted shoe, and a leaf spring interposed between said shoe and lever for yieldingly projecting the shoe.

6. In a friction clutch, the combination of a shoe support, a series of friction shoes pivoted to said support, a series of shoe-operating levers pivoted to said support, and a series of leaf springs interposed between each of the levers and the shoes next adjacent to the ones operated by the levers and anchored upon said levers for yieldingly projecting said shoes.

7. In a friction clutch, the combination of a shoe support, an outwardly-acting shoe pivoted to said support, a shoe-operating lever having a weight block for counteracting the effect of centrifugal force upon said shoe, and also having a spring-anchoring member, a second shoe pivoted to said support and a leaf spring having one end hooked to said member and its other end bearing against said second shoe for yieldingly projecting the latter and having an intermediate bearing against said weight block.

8. A driven unit for friction clutches comprising a driven shaft, a shoe-supporting spider thereon, a series of outwardly-acting shoes, shoe-operating levers pivoted on the respective spider arms, springs interposed between the shoes and levers for outwardly projecting the shoes, and a cam sleeve slidable along said shaft for acting on said levers to positively retract the shoes and having horns projecting beyond its cam portions between the spider arms.

9. A driven unit for friction clutches comprising a driven shaft, a shoe-supporting spider thereon, a series of outwardly-acting friction shoes and shoe-operating levers pivoted to the respective arms of said spider, said levers each having an arm connected with one of the shoes, springs interposed between the other arms of said levers and the next adjacent shoes for yieldingly projecting the latter, and a cam sleeve rearwardly movable along said shaft to engage said other arms of the levers for positively retracting the shoes against the pressure of said springs.

10. A friction clutch comprising a shoe including a body and a pair of side plates, a shoe-operating lever, and a link connecting said shoe and lever and having a pivot pin at its lever end located between the shoe side plates and retained thereby against axial displacement.

11. In a friction clutch, the combination of a shoe support, a shoe pivoted thereon, a shoe-operating lever having a counterweight block, a second shoe pivoted to said support and having a spring-anchoring member laterally spaced from its pivot, and a leaf spring having one end engaged with said member and its other end bearing against said second shoe for yieldingly projecting the latter, and having an intermediate bearing against said counterweight block.

12. In a friction clutch, the combination of a series of circumferentially-spaced pivoted shoes, a lever pivoted coaxially with one of said shoes for operating the adjacent shoe, and a leaf spring for projecting the first said shoe, said spring having one end anchored on the latter concentrically with the pivot axis thereof and bearing at an intermediate point against said lever.

THOMAS L. FAWICK.